April 13, 1971     B. B. ALLEN ET AL     3,574,803
METHOD OF MANUFACTURING A FOAMED CELLULOSE ESTER FILTER
Filed Nov. 15, 1966
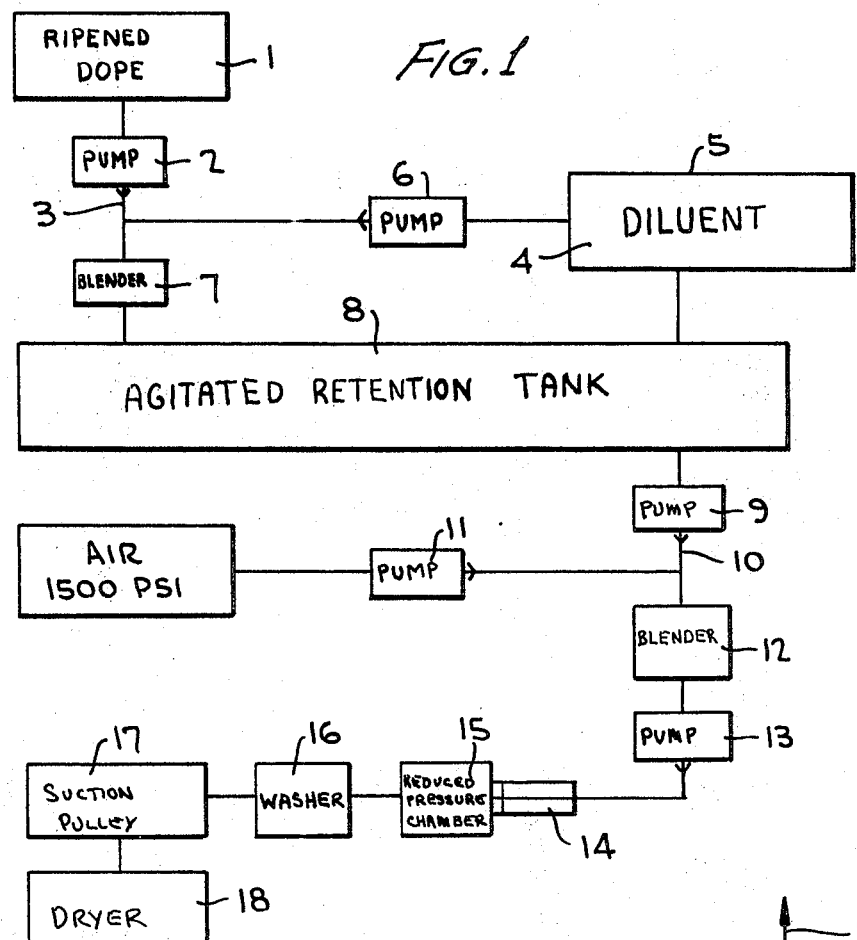
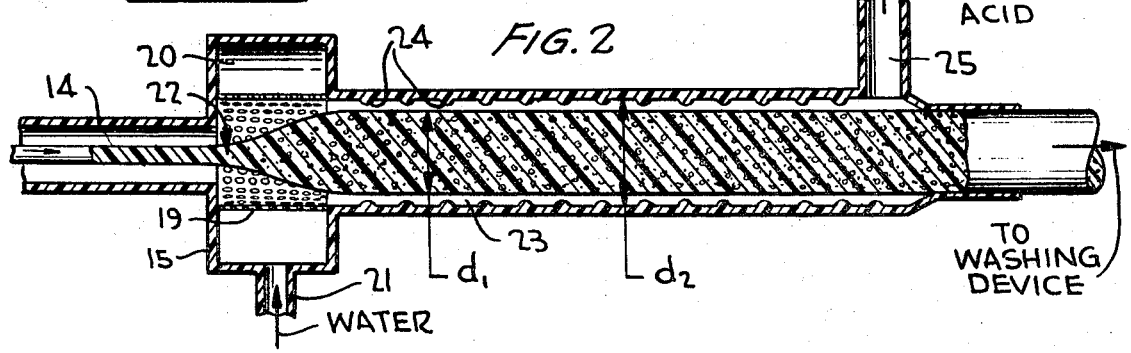
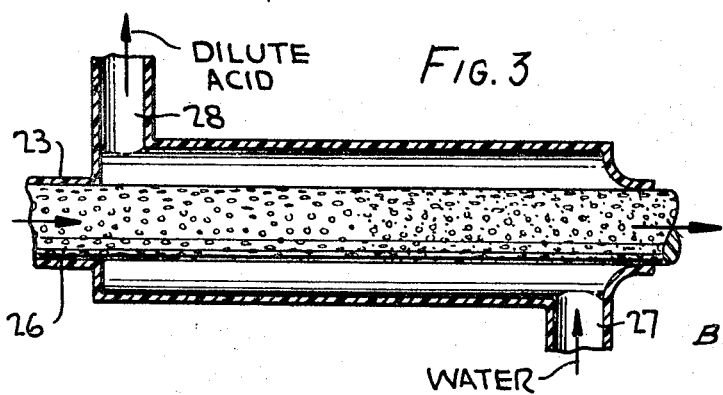
INVENTORS
JESSE L. RILEY
BRUCE B. ALLEN
BY D. J. DeWitt
Stephen D. Murphy
ATTORNEYS

United States Patent Office 3,574,803
Patented Apr. 13, 1971

3,574,803
METHOD OF MANUFACTURING A FOAMED CELLULOSE ESTER FILTER
Bruce B. Allen and Jesse L. Riley, Charlotte, N.C., assignors to Celanese Corporation, New York, N.Y.
Filed Nov. 15, 1966, Ser. No. 594,500
Int. Cl. B29d 7/02; C08b 27/04, 17/42, 21/02, 27/22, 29/38
U.S. Cl. 264—50
13 Claims

ABSTRACT OF THE DISCLOSURE

Cellulose ester foams are prepared by dissolving an inert gas under pressure into ripened cellulose ester dope at its incipient precipitation point and precipitating the cellulose ester while reducing the pressure on said dope to produce a solid foam.

---

This invention relates to a method of manufacturing foamed cellulose acetate. More particularly, the invention is directed to a process for producing foamed cellulose acetate having special use as a filtering element for a gas such as tobacco smoke.

The unique combination of properties found in cellulose acetate, namely toughness, high impact strength, low flammability and ease of fabrication, have established its use in such areas as the coating, photographic and molding industries. Its application has generally been confined to these areas because of the limitations to its use in solvent solutions, powdered or filament form. Heretofore, no process has been available which produces an open, or connected cell, foamed cellulose acetate structure, such as is required in filters, e.g. cigarette filters, air filters for gasoline combustion engines, or in sponges or in any other article requiring an intercommunicating pore structure.

A process for producing such a cellulose acetate structure has now been found. This process broadly comprises mixing ripened cellulose acetate dope with a suitable diluent to its incipient precipitation point, dissolving an inert gas under pressure in the diluted cellulose acetate dope, precipitating the cellulose acetate from the gas-containing dope solution, and reducing the pressure on the mixture thereby allowing the gas to expand and escape and the cellulose acetate to foam. The foamed solid structure may then be washed and dried by conventional means. The incipient precipitation point referred to above is that semi-stable state of solution at which separation of the cellulose acetate will result on slight additional dilution, preferably with water or dilute aqueous acetic acid.

The diluent used in diluting the ripened cellulose acetate dope to its incipient precipitation point may be any liquid which is miscible with acetic acid and which, below some concentration of acetic acid, is not a solvent for cellulose acetate. Illustrative of the diluents which may be used in this invention are chlorinated hydrocarbons such as carbon tetrachloride or ethyl chloride, the lower alkanols such as methyl alcohol, ethyl alcohol, butyl alcohol, formic acid, the lower ketones such as acetone or dioxane, and ethylene glycol ethers or esters such as ethylene glycol monoethyl ether or ethylene glycol monoethyl ether acetate. Preferred diluents are aqueous acid solutions such as aqueous acetic acid, although water is particularly preferred.

The foamed cellular plastics heretofore available have generally speaking been of three types: (1) those having closed cells, (2) those having open cells, (3) those having only the skeleton of the original cell structure. The closed cell structure has very few of its cells ruptured and is intended to provide a lightweight bulky material. The open cell structure has most of its cells ruptured, resulting in communication between the pores. However, filmy cell faces are still present. The skeletal structure has the filmy cell faces almost completely removed, leaving only the skeleton of the original cellular structure.

It is a particular embodiment of this invention to produce a foamed cellulose acetate product containing pores of the second type, i.e., those having an open cell structure. Such a product has wide versatility, including, especially, uses as a filter or adsorbent for solid-containing fluids. It can also be useful as a packaging material, as an insulation material, and the like.

It is an object of this invention to provide a process for the foaming of cellulose acetate. Another object of this invention is to produce a filter element having pores of regulated size. A still further object of this invention is to produce a filter element of uniform porosity. A specific object of this invention is to provide a filter element which is effective in removing harmful substances from tobacco smoke. Still other objects, as well as the nature, scope and utilization of the invention, will become apparent from the following description and the appended claims.

A broad aspect of this invention comprises the process for foaming cellulose acetate as previously described. However, in a preferred embodiment, the ripened cellulose acetate dope is diluted to its incipient precipitation point with water or an aqueous acid solution containing a measured amount of a gas adsorbent bubble nucleating agent as hereinafter more specifically described. The mixed nucleated solution is then saturated with an inert gaseous substance which dissolves in the solution under pressure, so as to bring about an equilibrium concentration of dissolved gas. Gases such as nitrogen which are not readily soluble will require elevated super-atmospheric pressure, e.g. 500 p.s.i.g. or higher, for dissolution. Those gases which have greater solubility such as carbon dioxide may be sufficiently dissolved under less pressure, e.g. 25 p.s.i.g. The gas laden nucleated liquid then passes into a reduced pressure chamber where it is contacted with water which causes precipitation of the cellulose acetate. The reduced pressure in the chamber, e.g. essentially atmospheric pressure, allows the gas to escape thereby producing a foaming action. The resulting foam is coagulated and washed to remove any residual acid or minerals. The foam may then be dried by conventional methods and cut to appropriate size and shape. When the coagulation is performed in a chamber or pipe having the proper diameter, the coagulated rod of foamed plastic issuing therefrom can be simply cut into segments of desired length, e.g. ½ inch, for direct use as a cigarette filter.

The concentration and size of the foamed pores in the filter thus formed depends upon the concentration of the nucleating agent and of the cellulose acetate in solution. In general, the filter element prepared according to this invention has a reticulate cellulose acetate structure having a continuum of open cell pores, uniformly distributed therethrough, preferably between about 25 to 2500 pores per linear inch with a pressure drop through a cylinder 8 mm. in diameter, and ½ inch long, of 10 to 100 mm. of water when passing water through this cylinder at a rate of 17.5 cc./second as measured on a Celanese Pressure Drop Tester, described in Celanese Technical Bulletin TD-37, p. 15. Most preferably, the filter structure is highly porous, comprising a major proportion, up to as much as 95 percent free volume.

Cellulose acetate is generally prepared by the reaction of cellulose with a mixture of acetic anhydride and glacial acetic acid in the presence of a catalyst in an otherwise well known manner. Generally a variety of catalysts may be used. However, for purposes of producing the cellulose acetate dope for use in this invention sulfuric acid is preferred. It may be used in a proportion of from about 1 to 10 weight percent based on the cellulose ester present. For the usual operation about 4 to 10 weight percent of sulfuric acid is suitable.

Cellulose acetate dissolved in acetone, or an aqueous acetic acid, etc., comprises a dope which is the basic substance from which the foamed structure of this invention is produced. The ripened, neutralized acid dope preferably used in this process contains from about 8 to 15 weight percent solids as cellulose acetate having an acetyl value of from about 42.5 to 59.5. The "acetyl value" as here used is the weight in grams of acetic acid which can be obtained by hydrolysis of 100 grams of dry cellulose acetate. The liquid medium is aqueous acetic acid solution of from 40 to 95% concentration but variations are of course permissible within the scope of the invention. A preferred aqueous acetic acid solution contains about 87 parts acetic acid to about 13 parts water.

The nucleating agents which are added to the ripened dope to produce foams of uniform porosity may be fine, uniformly sized solid particles of activated alumina, silica, pumice, activated carbon or other similar porous or microporous gas retaining solids. The amount which is added to the diluting solution and ultimately to the cellulose acetate dope may be from 0.000001 to 10 weight percent based on the cellulose acetate present in the dope depending on the average weight of the nucleating particle and the concentration of nuclei. An amount of 0.1 to 1 weight percent is preferred. Since the nucleating agents are retained in the final filter product, they are often desirably employed in greater amounts e.g. 0.1 10 weight percent, to take advantage of the independent adsorption effected by such agents, especially activated carbon. In the process of open foaming of cellulose acetate according to this invention, precipitation of the cellulose acetate occurs in the foaming zone at the same time as the expansion and foaming of the acetate. It is caused by contacting the nucleated stream of the semi-stable solution with a diluent such as water, thereby resulting in the precipitation of the cellulose acetate.

A more complete understanding of the invention may be had with reference to the accompanying drawing showing preferred embodiments of the invention.

FIG. 1 shows a flow diagram illustrating the process for producing the foamed cellulose acetate.

FIG. 2 is an enlarged view of the setting chamber showing the capillary and foam setting areas.

FIG. 3 illustrates the washer used to rapidly purge the foam of residual acetic acid and magnesium sulfate.

As shown in FIG. 1 the ripened cellulose acetate dope contained in a retention tank 1 is pumped by a metering pump 2 into a transfer line 3. The diluent, preferably water 4 containing gas adsorbent nucleating particles, e.g. 1 percent of finely powdered activated alumina, maintained in suspension by rigorous stirring and is contained in storage tank 5, is pumped by a metering pump 6 into the transfer line 3 where it mixes with the ripened cellulose acetate dope. The rate of metering pump 6 is such that the liquor added to the ripened dope dilutes it to its incipient precipitation point and if necessary may be adjusted during the run to maintain this condition. Simple preliminary empirical tests can be used to determine the proportion of diluent required to be added. For instance in a typical case water may be added at a rate corresponding to about 50% by volume of the dope. The nucleated solution is thoroughly mixed with the rotary blender 7 and passes into an agitated retention tank 8. The solution is pumped by pump 9 into transfer line 10. Air under pressure of 1500 p.s.i.g. is forced into this stream by a positive displacement pump 11 so that the air is totally dissolved in solution. The stream passes into a rotary blender 12. The metering pump 13 discharges the solution into a capillary 14 so sized as to take most of the pressure drop. The solution passes through the capillary into a reduced pressure chamber 15 where the cellulose acetate is precipitated when contacted with water circulated within the chamber. The reduced pressure in the chamber allows the dissolved air to escape from solution causing a foaming of the precipitated cellulose acetate. The nucleating elements in the solution assist in determining the pore formation and promoting uniform density of the substance. The foamed structure is then passed through a washer 16 where the foam is purged of residual acetic acid and any other soluble impurities. Excess water is drawn off by suction pulleys 17 followed by drying of the foam 18 by suitable means including conveyor oven or hot air drier using suction pulleys. The foam is then ready to be cut and packed.

As illustrated in more detail in FIG. 2, the capillary 14 leads into a chamber 15 maintained at essentially atmospheric pressure. Diffusion screens 19 allow water 20 from inlet 21 to circulate within the chamber and contact the nucleated stream 22. The water causes precipitation of the cellulose which simultaneously starts to form because of the reduced pressure allowing the gas to escape from solution. The stream diameter increases on leaving the capillary due to expansion of the foam bubbles in the chamber which is essentially at atmospheric pressure.

A maximum diameter, $d_1$ of $12\pm2$ mm. is attained which is 1 to 5 mm. less than the diameter of the channel $d_2$. The water entering from the inlet 21 helps convey the foam through the channel 23 ond dilutes the acetic acid which diffuses out of the foam. The surface of the channel 23 is arrayed with small lumps or projections 24, making the surface irregular and inducing small scale turbulence and mixing so that the flow in the circumferential water stream is not laminar. In addition, the bumps help to remove acetic acid from the foam by lowering the concentration gradient at the foam-water interface. The diffused diluted acetic acid is removed through an outlet 25.

As shown in FIG. 3, the set foam structure 26 passes from, and is supported by, setting channel 23. Water from inlet 27 flows perpendicularly to the axis of the foam and carries the diffused substances out of an outlet 28. Alternate devices including water feed and removal through perforated pulleys may also be used within the scope of the invention.

Various inert gases may be dissolved in solution to produce the foaming action. Any inert gas which is non-deleterious to the cellulose ester will be effective. Such gases include air, nitrogen, carbon dioxide, low boiling hydrocarbons such as propane, butane, pentane, etc., the low boiling chlorofluorohydrocarbons ("Freons"). In most cases the preferred gas, for economic reasons, is air. An important factor to note is that the solubility of the gas is a function of the temperature. Generally, the temperature in the process may vary within the range of 0° C. to 100° C. with the preferred range being 0° C. to 40° C. Pressures of up to 2000 p.s.i.g. may be desirable in some cases in order to dissolve the optimum amount of gas. The pressure required will to some extent depend on the temperature in the process. Typical pressures are within the range of 1000 to 2000 p.s.i.g.

While the foregoing description has dealt primarily with cellulose acetate for purposes of exemplification, it will be understood that with only minor variations the techniques described herein are applicable to the preparation of similar products from other ripened cellulose esters e.g. cellulose propionate, cellulose acetate butyrate, etc.

In the absence of indications to the contrary all proportions and concentrations of materials are expressed on a weight basis.

The principles, preferred embodiments, and modes of operation of the present invention have bene described in the foregoing specification. However, it should be understood that the invention which is intended to be pro-

We claim:
1. A process for producing foamed cellulose ester which comprises:
   mixing ripened cellulose ester dope with a diluent to its incipient precipitation point;
   dissolving an inert gas under pressure in the diluted solution;
   precipitating the cellulose ester from the dope solution; and
   reducing the pressure on the mixture during precipitation, thereby allowing the gas to escape and the cellulose ester to form a solid foam.
2. The process of claim 1 wherein the inert gas is air.
3. The process of claim 2 wherein the diluent is aqueous acidic acid.
4. The process according to claim 2 wherein the diluent is water.
5. A process for producing a cellulose acetate filter having uniform pore size and density which comprises:
   mixing a ripened cellulose acetate dope with an aqueous liquid to its incipient precipitation point, said liquid containing a gas adsorbent nucleating agent and being taken from the group consisting of water and aqueous acetic acid;
   dissolving an inert gas under pressure in the mixed nucleated solution;
   contacting the gas laden mixed solution with water to precipitate the cellulose acetate from the solution; and
   reducing the pressure on the gas laden solution during precipitation so as to cause a solid foam of the precipitated cellulose acetate to form.
6. The process according to claim 5 wherein the gas is dissolved in the mixed nucleated solution under a pressure of between about 25 p.s.i.g. to 2000 p.s.i.g.
7. A continuous process for producing a cellulose acetate filter having uniform pore size and density which comprises:
   mixing a ripened cellulose acetate dope with water containing from 0.000001 to 10 weight percent, based on the amount of cellulose acetate present, of a gas adsorbent nucleating agent;
   dissolving air under a pressure of between 1000 p.s.i.g. and 2000 p.s.i.g. in the nucleating solution;
   contacting the air laden nucleated solution in an elongated cylindrical zone with water to precipitate cellulose acetate therefrom;
   simultaneously reducing the pressure on the solution so as to cause a rod of foam of coagulated solid cellulose acetate to form;
   washing the foam with water; and
   drying the foam.
8. A process for producing a cellulose acetate filter having uniform pore size and density which comprises:
   suspending in water from about 0.000001 to 10 weight percent of a porous nucleating agent selected from the group consisting of alumina, silica, pumice, and activated carbon;
   mixing a sufficient amount of the suspension with a ripened cellulose acetate dope to dilute the dope to its incipient precipitation point;
   dissolving an inert gas in the nucleated solution under a pressure of from 1000 to 2000 p.s.i.g.;
   contacting a narrow stream of the nucleated solution with water to precipitate cellulose acetate therefrom;
   reducing the pressure on the stream of cellulose acetate to allow escape of the gaseous substance therefrom, thereby causing a foam of precipitated cellulose acetate to form;
   maintaining the foam in contact with water until it becomes substantially completely coagulated; and
   washing and drying the coagulated foam.
9. The process of claim 5 wherein the gas adsorbent nucleating agent is activated carbon.
10. The process of claim 5 wherein the gas adsorbent nucleating agent is silica.
11. The process of claim 5 wherein the gas adsorbent nucleating agent is alumina.
12. The process of claim 5 wherein the gas adsorbent nucleating agent is pumice.
13. The process of claim 8 wherein the gas is air.

References Cited

UNITED STATES PATENTS

| | | | |
|---|---|---|---|
| 2,242,373 | 5/1941 | Schneider | 106—122X |
| 2,336,310 | 12/1943 | Spence et al. | 106—196X |
| 2,372,695 | 4/1945 | Taylor | 106—122X |
| 2,398,001 | 4/1946 | Haney et al. | 106—122X |
| 2,418,211 | 4/1947 | Williams | 106—122 |
| 2,916,777 | 12/1959 | Crane et al. | 106—196UX |
| 3,025,130 | 3/1962 | White | 106—196UX |

FOREIGN PATENTS

| | | | |
|---|---|---|---|
| 438,540 | 11/1935 | Great Britain | 106—196 |
| 590,629 | 4/1959 | Italy | 131—268 |

PHILIP E. ANDERSON, Primary Examiner

U.S. Cl. X.R.

106—122, 196; 131—267; 264—187